(12) United States Patent
Lawniczak et al.

(10) Patent No.: US 12,153,463 B2
(45) Date of Patent: Nov. 26, 2024

(54) FAIL-SAFE GUIDE DEVICE

(71) Applicants: SAFRAN, Paris (FR); SAFRAN ELECTRONICS & DEFENSE, Paris (FR)

(72) Inventors: Rémi-Louis Lawniczak, Moissy-Cramayel (FR); Frédéric Laurensan, Moissy-Cramayel (FR); Thierry Cartry, Moissy-Cramayel (FR); Xavier Betbeder-Laüque, Moissy-Cramayel (FR)

(73) Assignees: SAFRAN, Paris (FR); SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 18/254,363

(22) PCT Filed: Nov. 15, 2021

(86) PCT No.: PCT/EP2021/081742
§ 371 (c)(1),
(2) Date: May 24, 2023

(87) PCT Pub. No.: WO2022/112046
PCT Pub. Date: Jun. 2, 2022

(65) Prior Publication Data
US 2024/0019889 A1    Jan. 18, 2024

(30) Foreign Application Priority Data

Nov. 26, 2020   (FR) .................................. FR2012202

(51) Int. Cl.
*G05G 9/047*   (2006.01)
*B64C 13/04*   (2006.01)
(Continued)

(52) U.S. Cl.
CPC ......... *G05G 9/047* (2013.01); *B64C 13/0421* (2018.01); *F16C 35/042* (2013.01);
(Continued)

(58) Field of Classification Search
CPC ......... G05G 9/047; G05G 2009/04718; G05G 2009/04766; F16C 2326/43; F16C 35/067; B64C 13/0421
See application file for complete search history.

(56) References Cited

U.S. PATENT DOCUMENTS

2013/0256463 A1 * 10/2013 Antraygue .......... B64C 13/0421
                                                    244/234
2016/0252926 A1 *  9/2016 Gomolko ............ B64C 13/0421
                                                    244/234

FOREIGN PATENT DOCUMENTS

FR              3011815 A1     4/2015
FR              3086273 A1     3/2020
WO     WO2020225305 A1    11/2020

* cited by examiner

*Primary Examiner* — Richard G Davis
(74) *Attorney, Agent, or Firm* — Muncy, Geissler, Olds & Lowe, P.C.

(57) ABSTRACT

A device comprising: a stand; a frame rotatably mounted relative to the stand; a control arm rotatably mounted on the frame; a roll spider rotatably mounted on the frame; a pitch spider rotatably mounted on the control arm; a roll motor that is stationary relative to the frame and that includes a roll pin rotatably mounted on the roll spider; and a pitch motor that is stationary relative to the frame and that includes a pitch pin rotatably mounted on the pitch spider. A rotary connection device.

18 Claims, 12 Drawing Sheets

(51) Int. Cl.
*F16C 35/04* (2006.01)
*F16C 35/067* (2006.01)
(52) U.S. Cl.
CPC ........ *F16C 35/067* (2013.01); *F16C 2326/43* (2013.01); *G05G 2009/04718* (2013.01); *G05G 2009/04766* (2013.01); *G05G 2505/00* (2013.01)

FAIL-SAFE GUIDE DEVICE

BACKGROUND OF THE INVENTION

Patent application FR-A-3 011 815 discloses an aircraft flight control device comprising a stand having a frame rotatably mounted thereon to turn about a first axis. A control arm for connecting to a control handle is rotatably mounted on the frame and includes a pitch spider rotatably mounted on the control arm. A roll spider rotatably mounted on the frame is connected to a roll pin rotatably mounted on the roll spider. The roll pin is connected to a motor. A pitch motor includes a pitch pin rotatably mounted on the pitch spider. The pitch and roll motors provide haptic feedback to the user of the flight control device and they measure (roll and pitch) commands applied by the user to the control handle. Such a control device makes use of six rotary connection devices. In general, the rotary connection is provided by a pin of a male element mounted to be rotatable to turn relative to a housing in a female element by means of a rolling bearing received in a housing in the female element.

In the event of the male element and/or the female element breaking (cracking or fracturing), the bearing might escape from its housing or might become jammed therein, thereby giving rise to total or partial loss of the control function. Since such loss can lead to a situation that is catastrophic, there is a need to provide the rotary connections of such a control device with protection against the male and female elements breaking.

OBJECT OF THE INVENTION

A particular object of the invention is to preserve a rotary guidance function between a male element and a female element in the event of one of the elements breaking.

In an application to a flight control device, an object of the invention is to guarantee that the functions of providing haptic feedback and of measuring the movement of a control handle connected to the flight control device are maintained in spite of one of the elements of the flight control device breaking.

SUMMARY OF THE INVENTION

To this end, there is provided a rotary connection device comprising a female element and a male element rotatably mounted in the female element to turn about a first axis via a guide bearing for providing rotary guidance. According to the invention, each element comprises two parts, both arrangement to carry the bearing in such a manner as to hold the bearing in position independently of either one of the parts of the same element breaking.

Thus, either one of the elements breaking does not cause rotary guidance to be lost.

In the meaning of the present application, a bearing is carried by a part when the part ensures that the bearing is in a fixed position relative to said part and when it takes up the components of forces applied to the bearing normally to its axis of rotation.

Advantageously, the female element comprises both a first female element part and a second female element part, and the bearing includes first fastener means for fastening to the first female element part and second fastener means for fastening to the second female element part.

A particularly economic embodiment is obtained when the first and/or second fastener means comprise a lug projecting from an outer surface of the guide bearing.

Connecting the bearing to the elements is made easier when the lug includes at least one hole.

In a first particular embodiment of the female element, the female element includes a first housing for receiving the bearing and defined jointly by the first female element part and by the second female element part, the first female element part defining a first sector of the first housing centered about the first axis and the second female element part defining a second sector of the first housing centered about the first axis. It is possible to make elements that are symmetrical when the first sector has a first amplitude substantially equal to one hundred eighty degrees, and the second sector has a second amplitude substantially equal to one hundred eighty degrees.

In a second particular embodiment of the female element, the female element includes a first housing for receiving the bearing and defined jointly by a first female element part defining a first portion of the first housing and by a second female element part defining a second portion of the first housing, the first and second portions of the first housing extending on opposite sides of a first plane orthogonal to the first axis.

It is possible to simplify manufacture and assembly when the second female element part comprises first and second half-shells that are assembled to each other.

In a third particular embodiment of the female element, the female element comprises a first female element part defining a first housing for receiving the bearing and a second female element part defining a second housing for receiving the first female element part.

In a first particular embodiment of the male element, the male element comprises first and second male element parts provided with third means for rotatably connecting them to turn about the first axis.

The device is very compact when the first male element part includes a first opening through which the second male element part extends, at least partially.

Forces are transmitted in particularly effective manner when the first opening that extends along a direction substantially parallel to the first axis and/or when the first male element part also includes a second opening that extends along a direction substantially orthogonal to the first axis and through which the second male element part extends, at least partially.

In a second particular embodiment of the male element, the male element comprises a first male element part engaged in a second male element part.

Advantageously, the male element includes a second connection device for rotary connection to turn about a second axis. Such a device has a particularly advantageous application when the second rotary connection device to turn about a second axis is in accordance with any of the above-described devices.

The invention also provides an aircraft flight control device comprising a stand, a frame rotatably mounted relative to the stand to turn about a first main axis; and a control arm for connecting to a manual handling interface and rotatably mounted on the frame by means of a first rotary connection device. A roll spider is rotatably mounted on the frame by means of a second rotary connection device. A pitch spider is rotatably mounted on the control arm by means of a third rotary connection device. A roll motor is mounted to be stationary relative to the frame and it includes a roll pin rotatably mounted on the roll spider by means of a fourth rotary connection device. A pitch motor is mounted to be stationary relative to the frame and it includes a pitch pin rotatably mounted on the pitch spider by means of a fifth rotary connection device. According to the invention, the first to fifth rotary guide devices are in accordance with any of those described above.

Other characteristics and advantages of the invention appear on reading the following description of a particular embodiment of the invention.

BRIEF DESCRIPTION OF THE DRAWINGS

Reference is made to the accompanying drawings, in which.

DETAILED DESCRIPTION OF THE INVENTION

Figure 1:
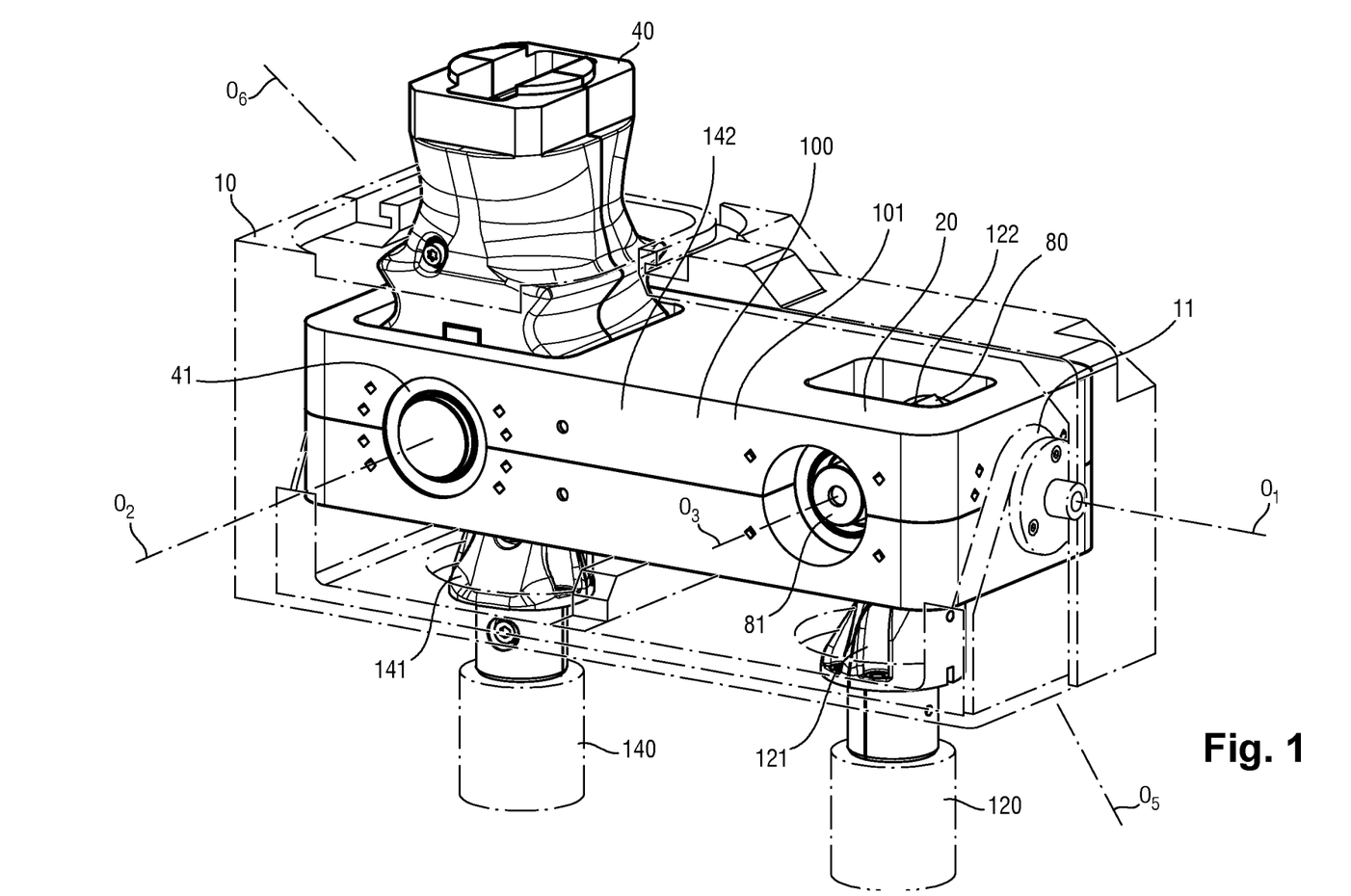
FIG. 1 is a diagrammatic perspective view of a control device of the invention, in which the stand is shown as being transparent.

With reference to FIG. 1, the flight control device of the invention, given overall reference 1, comprises:
  a stand 10;
  a frame 20 rotatably mounted relative to the stand 10 to turn about a first axis $O_1$ by means of a first rotary connection device 11;
  a control arm 40 rotatably mounted on the frame 20 to turn about a second axis of rotation $O_2$ by means of a second rotary connection device 41;
  a roll spider 80 rotatably mounted on the frame 20 to turn about a third axis of rotation $O_3$ by means of a third rotary connection device 81;
  a pitch spider 100 rotatably mounted on the control arm 40 to turn about a fourth axis of rotation $O_4$ by means of a fourth rotary connection device 101;
  a roll motor 120 secured to the stand 10 and having a roll pin 121 rotatably mounted on the roll spider 80 to turn about a fifth axis of rotation $O_5$ by means of a fifth rotary connection device 122; and
  a pitch motor 140 secured to the stand 10 and including a pitch pin 141 rotatably mounted on the pitch spider 100 to turn about a sixth axis of rotation $O_6$ by means of a sixth rotary connection device 142.

Figure 2:
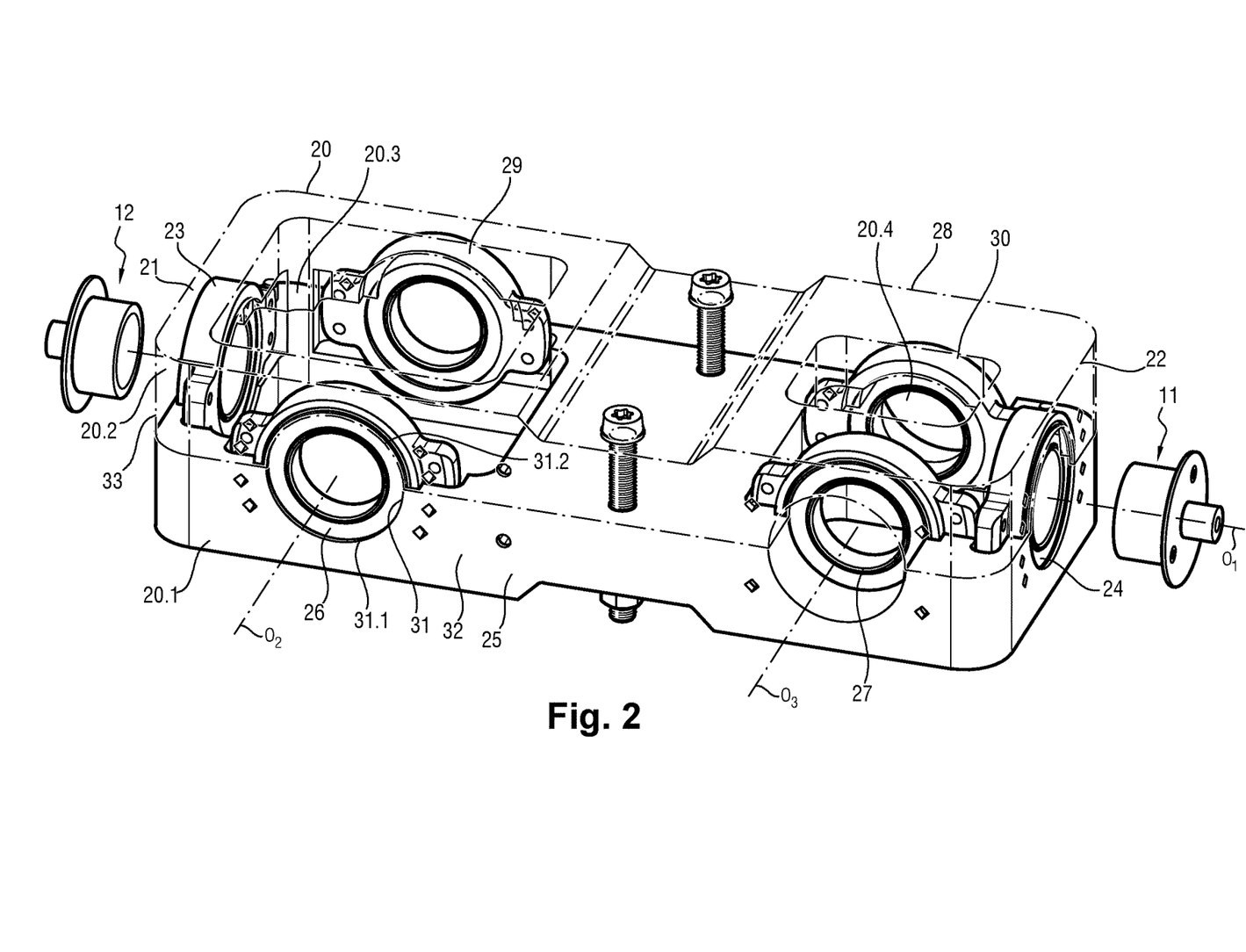
FIG. 2 is a diagrammatic perspective view of a frame of the device of the invention.
Figure 3:
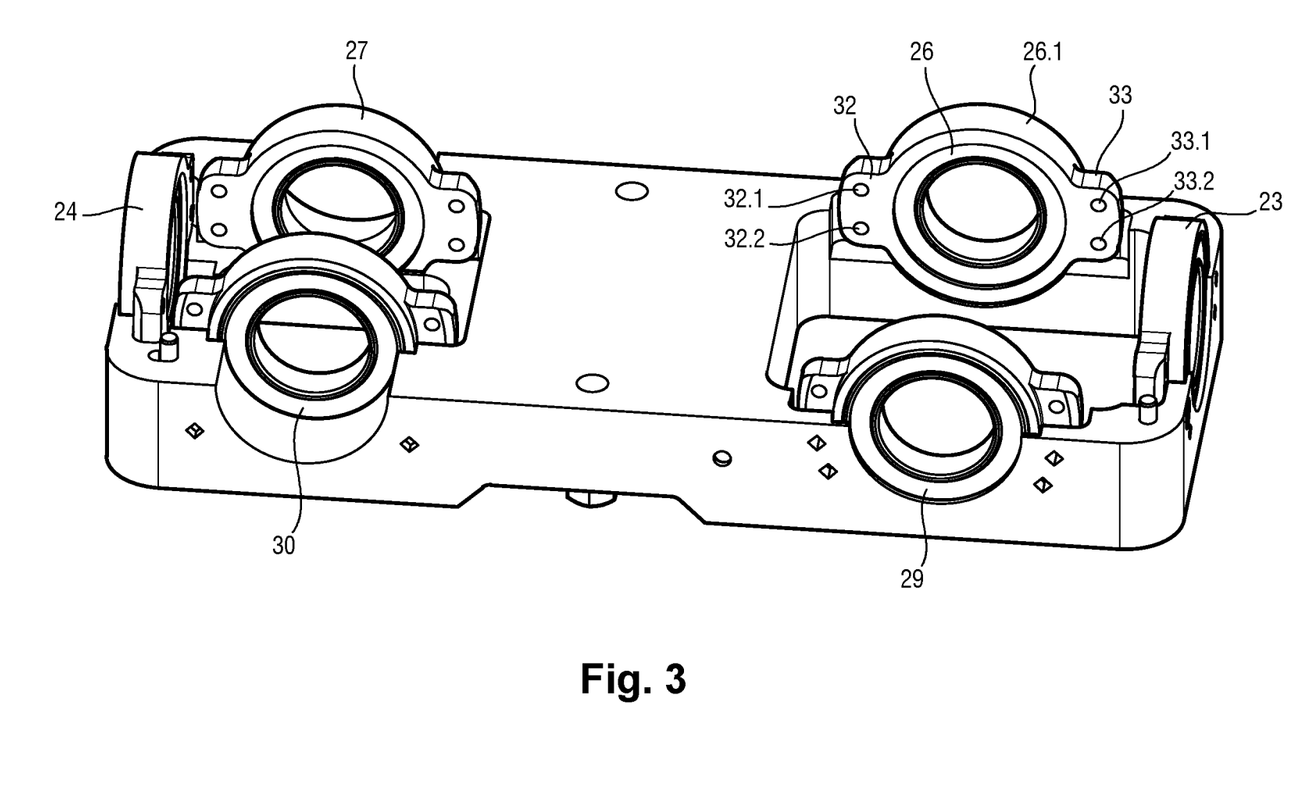
FIG. 3 is a fragmentary diagrammatic perspective view of the FIG. 2 device seen from a different point of view.
Figure 4:
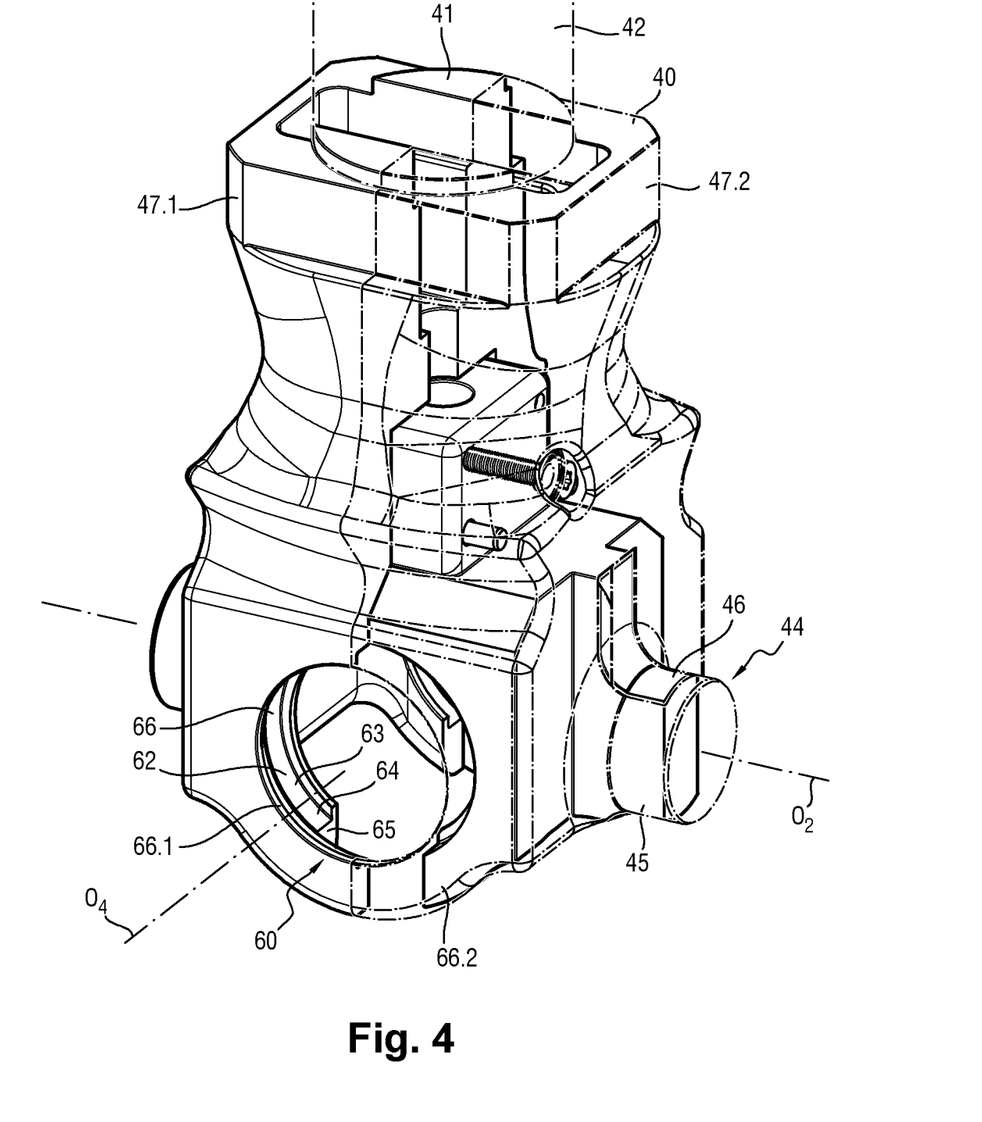
FIG. 4 is a diagrammatic perspective view of a control arm of the device of the invention.

With reference to FIGS. 2 to 4, the frame 20 is substantially rectangular in shape having two short faces 21 and 22 respectively carrying a first bearing 23 (specifically a ball bearing) and a second bearing 24 (specifically a ball bearing) for hinging the frame 20 about the first axis $O_1$. The first long face 25 includes a third bearing 26 and a fourth bearing 27. The second long face 28 includes a fifth bearing 29 and a sixth bearing 30. The frame 20 comprises a first part 20.1 and a second part 20.2, specifically a first half-frame 20.1 and a second half-frame 20.2, these parts being assembled together along a join plane containing the axes $O_2$ and $O_3$ and being connected to each other by bolting.

As can be seen in FIG. 2, the third bearing 26 is received in a first cylindrical housing 31 the frame 20. Together, the first and second half-frames 20.1 and 20.2 define the first housing 31. The first half-frame 20.1 defines a first sector 31.1 of the first housing 31 centered about the second axis $O_2$, and the second half-frame 20.2 defines a second sector 31.2 of the first housing 31 centered about the first axis. In this example, the first sector 31.1 and the second sector 31.2 both occupy a respective amplitude of one hundred eighty degrees and they are open to the join plane.

The third bearing 26 comprises an outer ring provided with first and second lugs 32 and 33 projecting from the outer ring 26.1. In this example, the first and second lugs 32 and 33 are diametrically opposite and they are received in respective notches formed in the frame 20 across both the first and the second half-frames 20.1 and so as to open out into the first housing 31. The first lug 32 includes first and second holes 32.1 and 32.2 that receive respectively a first screw for fastening to the first half-frame 20.1 and a second screw for fastening to the second half-frame 20.2 (screws not shown). In corresponding manner, the second lug 33 includes third and fourth holes 33.1 and 33.2 that receive respectively a third screw for fastening to the first half-frame 20.1 and a fourth screw for fastening to the second half-frame 20.2 (screws not shown).

Thus, the third bearing 26 is carried by the first half-frame 20.1 via the first and third screws, and by the second half-frame 20.2 via the second and fourth screws. In the event of the first half-frame 20.1 breaking, the third bearing 26 is carried by the second half-frame 20.2 and the function of the third bearing 26 of providing rotary guidance about the second axis $O_2$ is conserved.

The first bearing 23, the second bearing 24, the fourth bearing 27, the fifth bearing 29, and the sixth bearing 30 are all connected to the frame 20 using arrangements similar to those described for the third bearing 26.

Thus, the frame 20 comprises two parts, namely the first half-frame 20.1 and the second half-frame 20.2, both of which parts are arranged to carry the bearing 23, 24, 26, 27, 29, and 30 in such a manner as to hold these bearings in position independently of one of the half-frames 20.1 or 20.2 breaking.

Figure 5:
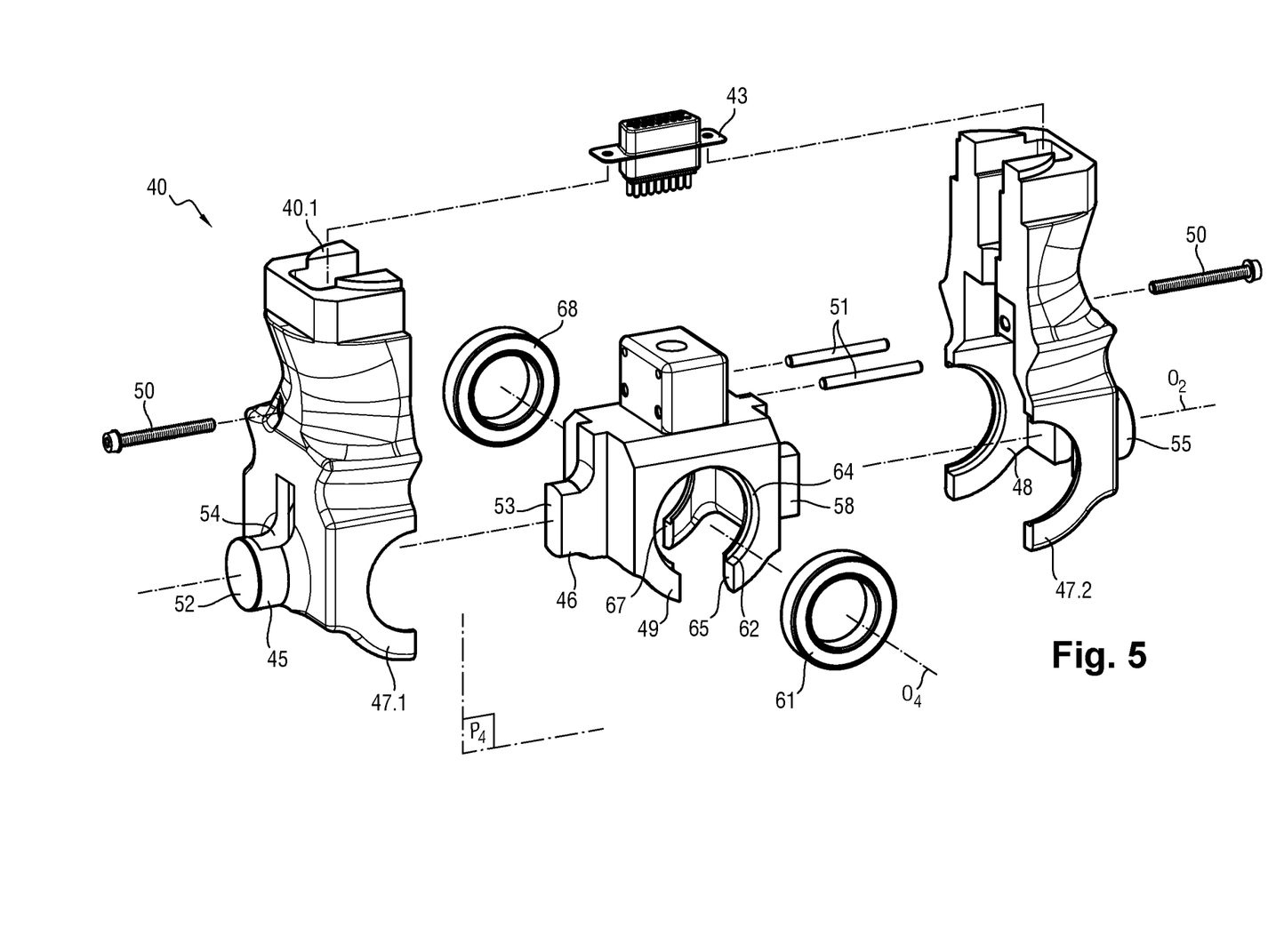
FIG. 5 is an exploded diagrammatic perspective view of the FIG. 4 control arm.

With reference to FIGS. 4 and 5, the control arm includes a base 40.1 for receiving a control handle 42. The base 40.1 has mechanical connection means and electronic connection means (specifically a connector 43) for connecting the handle 42 to the control arm 40.

The control arm 40 presents a male element, specifically a first pin 44, which element is received in the third bearing 26.

The first pin 44 comprises two male element parts, namely a first male element part 45 and a second male element part 46.

As can be seen particularly in FIG. 5, the control arm 40 comprises first and second half-shells 47.1 and 47.2 that jointly define a second internal housing 48 that is substantially cube-shaped for receiving a first core 49.

The first and second half-shells 47.1 and 47.2 are connected to each other by means of screws 50 that also pass through the first core 49. Two shear pins 51 also provide connection between the first half-shell 47.1, the second half-shell 47.2, and the first core 49. Thus, the first core 49 is constrained to move in rotation with the first and second half-shells 47.1 and 47.2 about the first axis $O_2$.

The first male element part 45 is defined by the first half-shell 47.1 and includes a first opening 52 that is substantially coaxial about the second axis $O_2$ and through which the second male element part 46 extends, which part is defined by a first protrusion 53 of the first core 49.

The first male element part 45 also includes a second opening 54 that extends in a direction substantially orthogonal to the second axis $O_2$. The first protrusion 53 also extends through the second opening 54.

The control arm 40 presents another male element, specifically a second pin 55, which element is received in the fifth bearing 29. In corresponding manner to the first pin 44, the second pin 55 comprises two male element parts, namely third and fourth male element parts 56 and 57 that are defined respectively by the second half-shell 47.2 and by a second protrusion 58 of the first core 49.

Thus, the control arm 40 has two parts, the half-shell 47.1 and the first core 49, which parts are both arranged to carry the third bearing 26 in such a manner as to hold the third bearing 26 in position independently of either the first half-shell 47.1 or the first core 49 breaking.

The first pin 44, the second pin 55, the third bearing 26, and the fifth bearing 29 jointly define the second rotary connection device 41. More precisely, the first pin 44 and the second pin 55 of the control arm 40 define a male element of the second rotary connection device 41. The first housing 31 of the third bearing 26 and the housing of the fifth bearing 29 of the frame 20 jointly define a female element of the second rotary connection device 41.

With reference to FIGS. 4 and 5, the control arm 40 has a third housing 60 for receiving a seventh bearing 61 (specifically a ball bearing) for guiding movement in rotation about the fourth axis $O_4$.

The third housing 60 is defined jointly by first and second portions 62 and 63 of the third housing 60. The first and second portions 62 and 63 of the third housing 60 extend on opposite sides of a first plane $P_4$ orthogonal to the fourth axis $O_4$. The first portion 62 corresponds to a first counterbore 64 that is made in the first core 49 and that includes a radial cutout 65. The second portion 63 corresponds to a second cutout 66 made up of a first half-cutout 66.1 made in the first half-shell 47.1 and a second half-cutout 66.2 made in the second half-shell 47.2.

Thus, the control arm 40 has two parts, namely the first core 49 and also the half-shells 47.1 and 47.2, both of which parts are arranged to carry the seventh bearing 61 in such a manner as to hold the seventh bearing 61 in position independently of the first core 49 breaking or of the half-shells 47.1 and 47.2 breaking.

The control arm 40 also has a fourth housing 67 for receiving an eighth bearing 68 (specifically a ball bearing) for guiding movement in rotation about the fourth axis $O_4$. The fourth housing 67 is symmetrical to the third housing 60 and is designed in the same manner.

Figure 6:
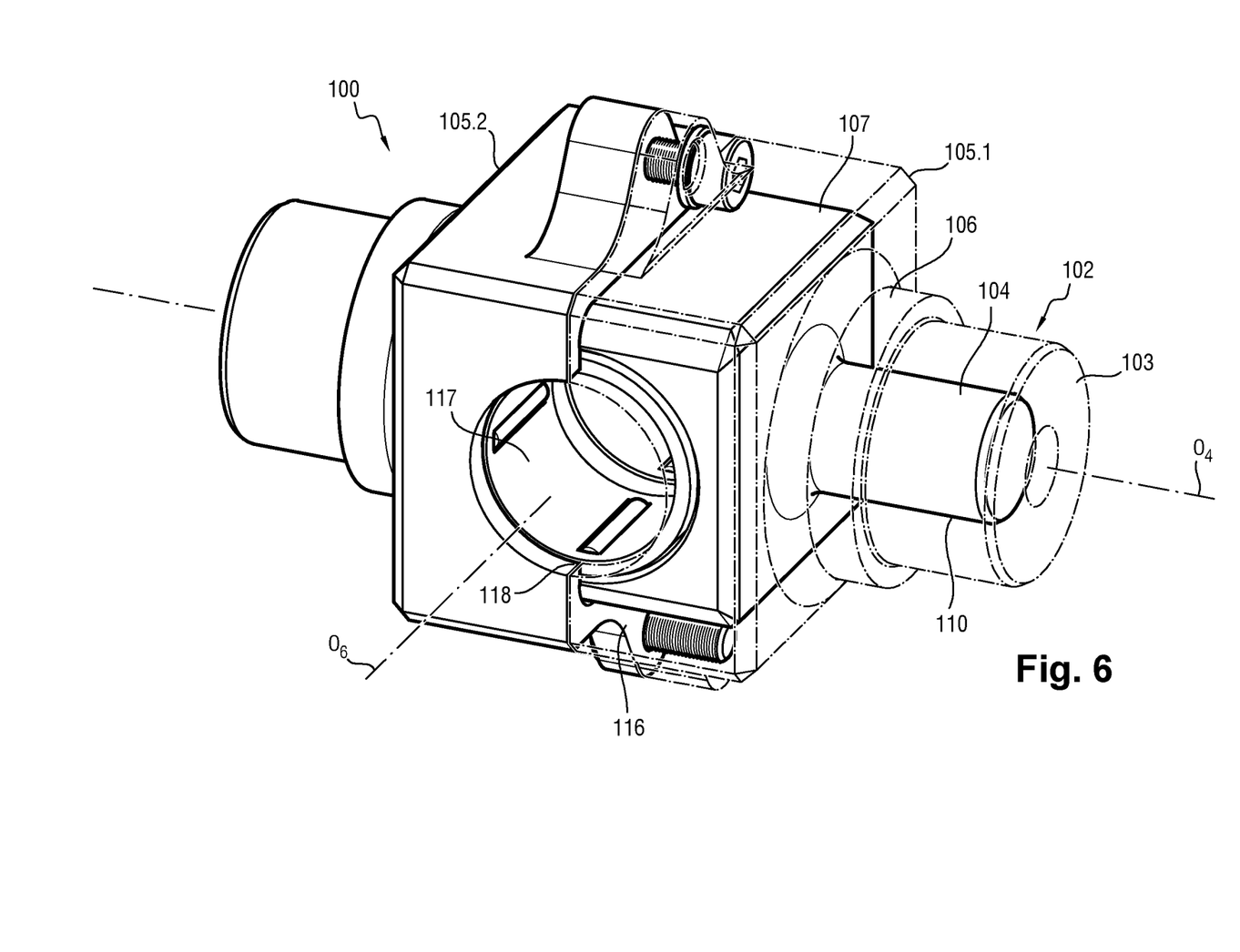
FIG. 6 is a diagrammatic perspective view of a pitch spider of the device of the invention.
Figure 7:
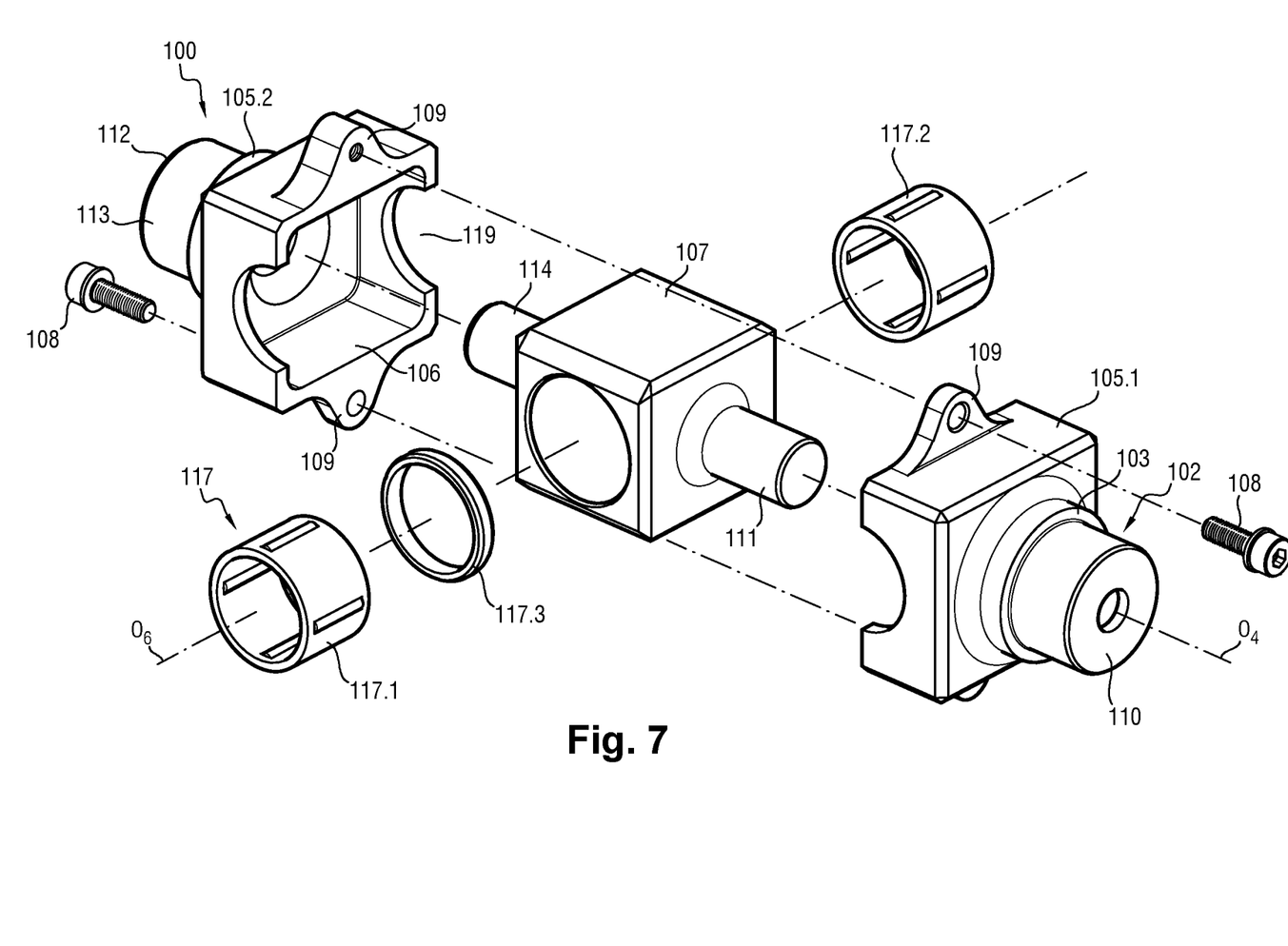
FIG. 7 is an exploded diagrammatic perspective view of the FIG. 6 pitch spider.

With reference to FIGS. 6 and 7, the pitch spider 100 comprises a male element, specifically a third pin 102, which pin is received in the seventh bearing 61 and extends along the fourth axis $O_4$.

The third pin 102 comprises two male element parts, namely a fifth male element part 103 and a sixth male element part 104.

The pitch spider 100 comprises third and fourth half-shells 105.1 and 105.2 that jointly define a fifth internal housing 106 that is substantially cube-shaped for receiving a second core 107.

The third and fourth half-shells 105.1 and 105.2 are connected to each other by means of screws 108 engaged in lugs 109 that are secured to the half-shells 105.1 and 105.2. Thus, the second core 107 is constrained to move in rotation with the third and fourth half-shells 105.1 and 105.2 about the fourth axis $O_4$.

The fifth male element part 103 is defined by the third half-shell 105.1 and includes a third opening 110 that is substantially coaxial about the fourth axis $O_4$ and through which there extends the sixth male element part 104, which part is defined by a third protrusion 111 of the second core 107.

The pitch spider 100 presents another male element, specifically a fourth pin 112, which pin is received in the eighth bearing 68. In manner corresponding to the third pin 102, the fourth pin 112 comprises a seventh male element part 113 and an eighth male element part 114 that are defined respectively by the fourth half-shell 105.2 and by a fourth protrusion 115 of the second core 107, in a manner similar to the fifth male element part 103 and the sixth male element part 104.

Thus, the pitch spider 100 comprises two parts, a third half-shell 105.1 and a second core 107, which parts are both arranged to carry the seventh bearing 61 in such a manner as to hold the seventh bearing 61 in position independently of the second core 107 breaking or of the first half-shell 105.1 breaking.

The third pin 102, the fourth pin 112, the seventh bearing 61, and the eighth bearing 68 jointly define the fourth rotary connection device 101.

More precisely, the third pin 102 and the fourth pin 112 of the pitch spider 100 define a male element of the fourth rotary connection device 101. The third housing and the fourth housing 67 of the control arm 40 define a female element of the fourth rotary connection device 101.

Thus, the parts (the first core 49 and also the half-shells 45.1 and 45.2) constituting the male element of the second rotary connection device 41 connecting the control arm 40 to the frame 20 also comprise a female element of the fourth rotary connection device 101 connecting the control arm 40 to the pitch spider 100.

Still with reference to FIGS. 6 and 7, the pitch spider 100 includes a fifth housing 116 for receiving a ninth bearing 117 in order to guide rotation about the sixth axis $O_6$. In this example, the ninth bearing 117 comprises first and second half-bearings 117.1 and 117.2 that are made up of two identical roller bearings separated by a spacer 117.3.

The fifth housing 116 extends inside the second core 107. Each of the third and fourth half-shells 105.1 and 105.2 includes two semi-circular openings that jointly define first and second circular openings 118 and 119. The inside diameter of the first opening 118 is greater than or equal to the inside diameter of the bearing 117 and less than the outside diameter of the bearing 117. Thus, the third and fourth half-shells 105.1 and 105.2 prevent the ninth bearing 117 from moving in translation along a direction parallel to the sixth axis $O_6$.

The pitch spider 100 thus comprises two parts (namely the second core 107 and also the two half-shells 105.1 and 105.2), both of which parts are arranged to carry the ninth bearing 117 in such a manner as to hold the ninth bearing 117 in position independently of the second core 107 breaking or of the half-shells 105.1 and 105.2 breaking.

Figure 8:
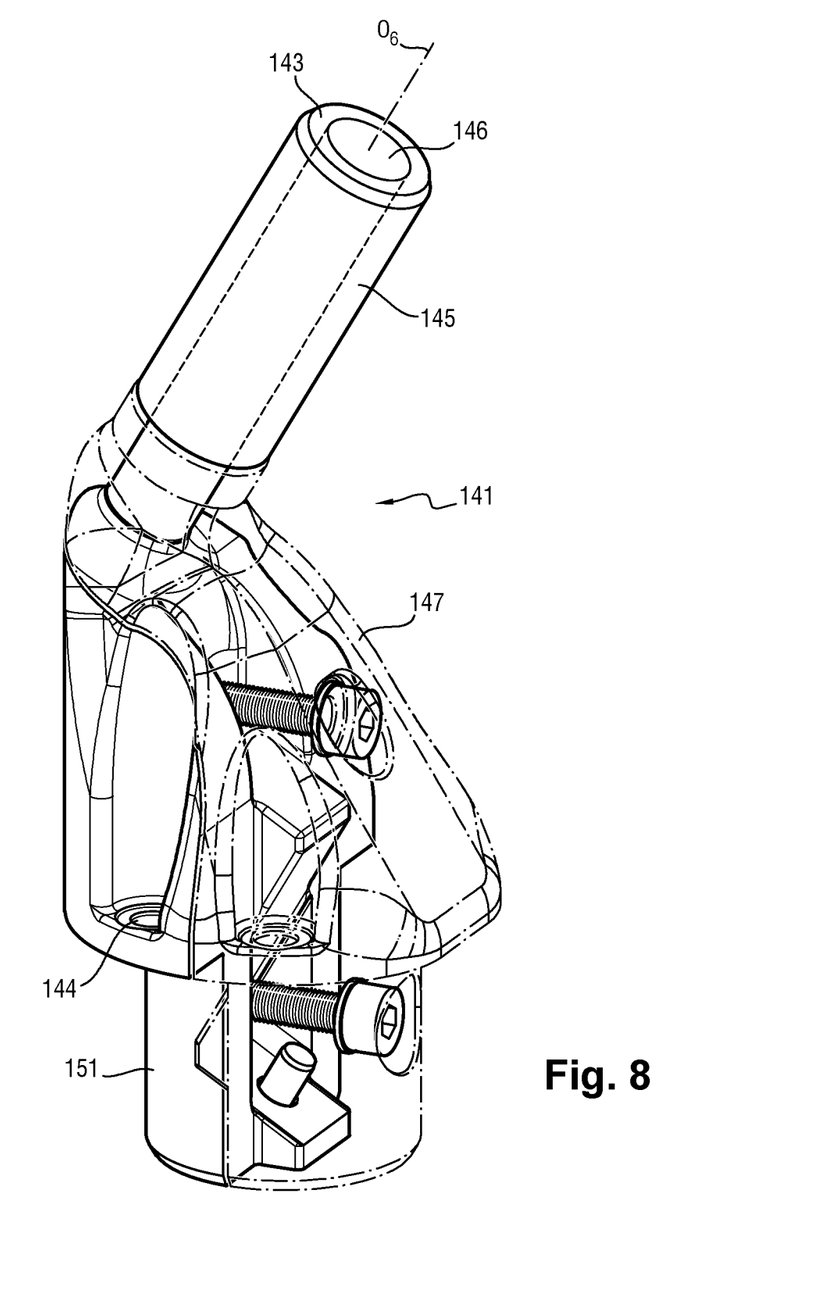
FIG. 8 is a diagrammatic perspective view of a pitch pin of the device of the invention.
Figure 9:
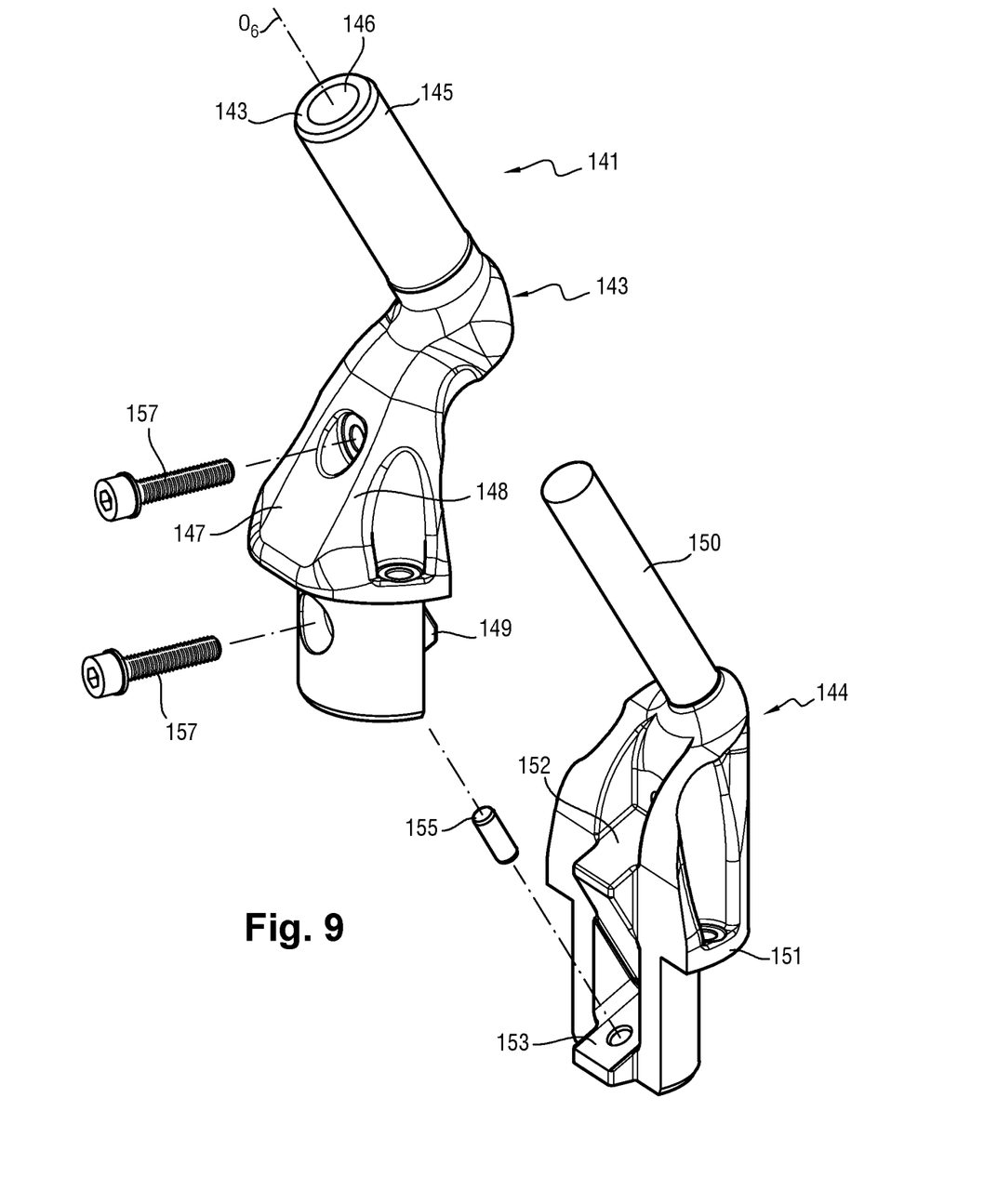
FIG. 9 is an exploded diagrammatic perspective view of the FIG. 8 pitch pin.

With reference to FIGS. 8 and 9, the pitch pin 141 comprises two male element parts, namely ninth and tenth male element parts 143 and 144.

The ninth male element parts 143 comprises a cylindrical portion 145 inside which there extends a bore 146 along a direction substantially parallel to the sixth axis $O_6$. The ninth male element part 143 also comprises a first base 147 provided with first and second tongues 148 and 149.

The tenth male element part 144 comprises a cylindrical portion 150 that is engaged in the bore 146. The tenth male element part 144 also comprises a second base 151 that is provided both with a first groove 152 that receives the first tongue 148, and also with a second groove 153 that receives the second tongue 149. The ninth and tenth male element parts 143 and 144 are connected to each other by a screw 154 and by a shear pin 155.

The pitch pin 141 is engaged in the ninth bearing 117 of the pitch spider 100.

Thus, the pitch pin 141 comprises two parts, namely the ninth and the tenth male element parts 143 and 144, both of which parts are arranged to carry the ninth bearing 117 in such a manner as to hold the ninth bearing 117 in position independently of the ninth or the tenth male element part 143 or 144 breaking. The ninth bearing 117 acts as a band around the pitch pin 141 and thus contributes to ensuring that the ninth and tenth male element parts 143 and 144 are connected together.

The pitch pin 141 and the ninth bearing 117 define the sixth rotary connection device 142.

More precisely, the pitch pin 141 defines a male element of the sixth rotary connection device 142. The fifth housing 116 of the pitch spider 100 defines a female element of the sixth rotary connection device 142.

Figure 10:
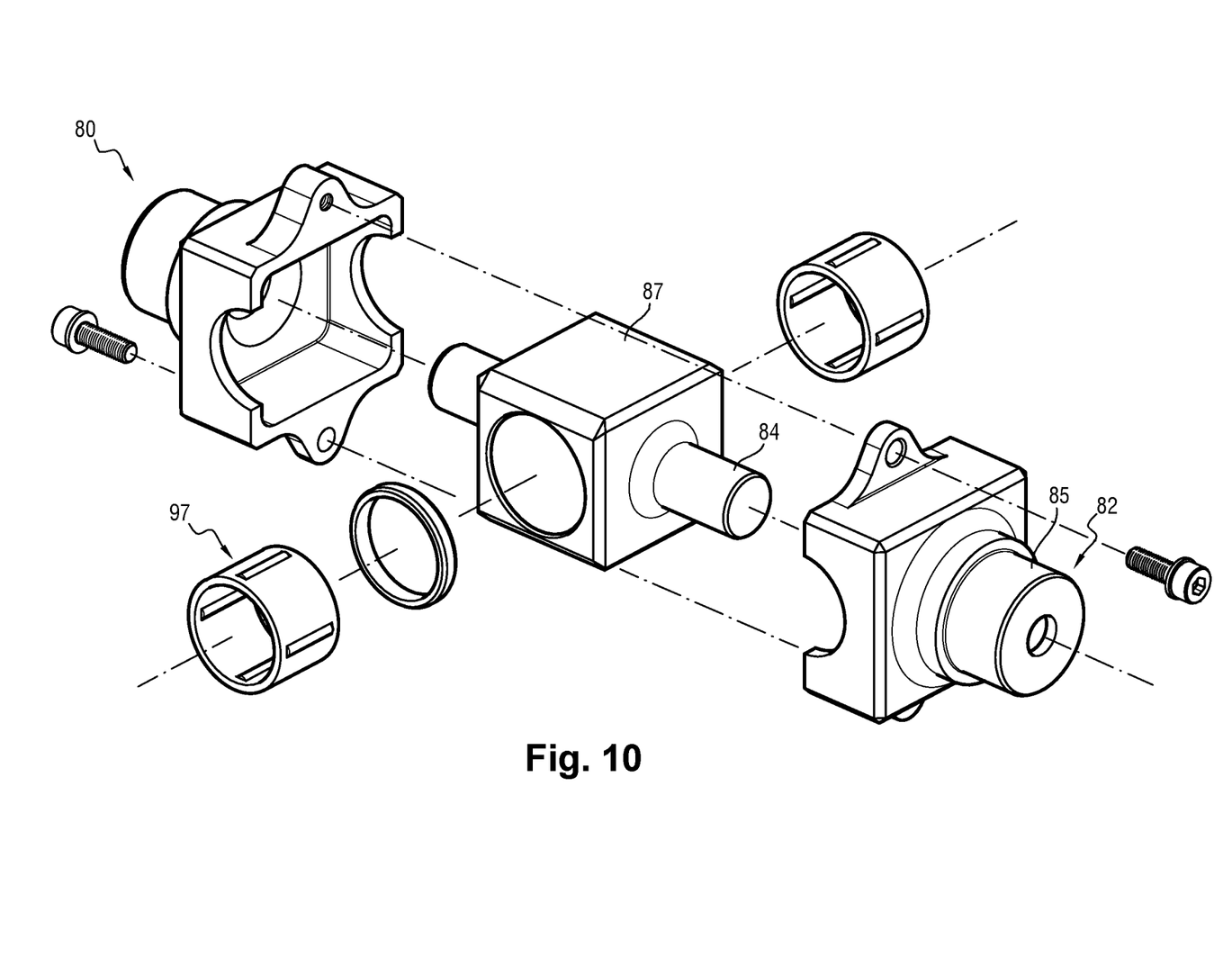
FIG. 10 is an exploded diagrammatic perspective view of a roll spider of the device of the invention.
Figure 11:
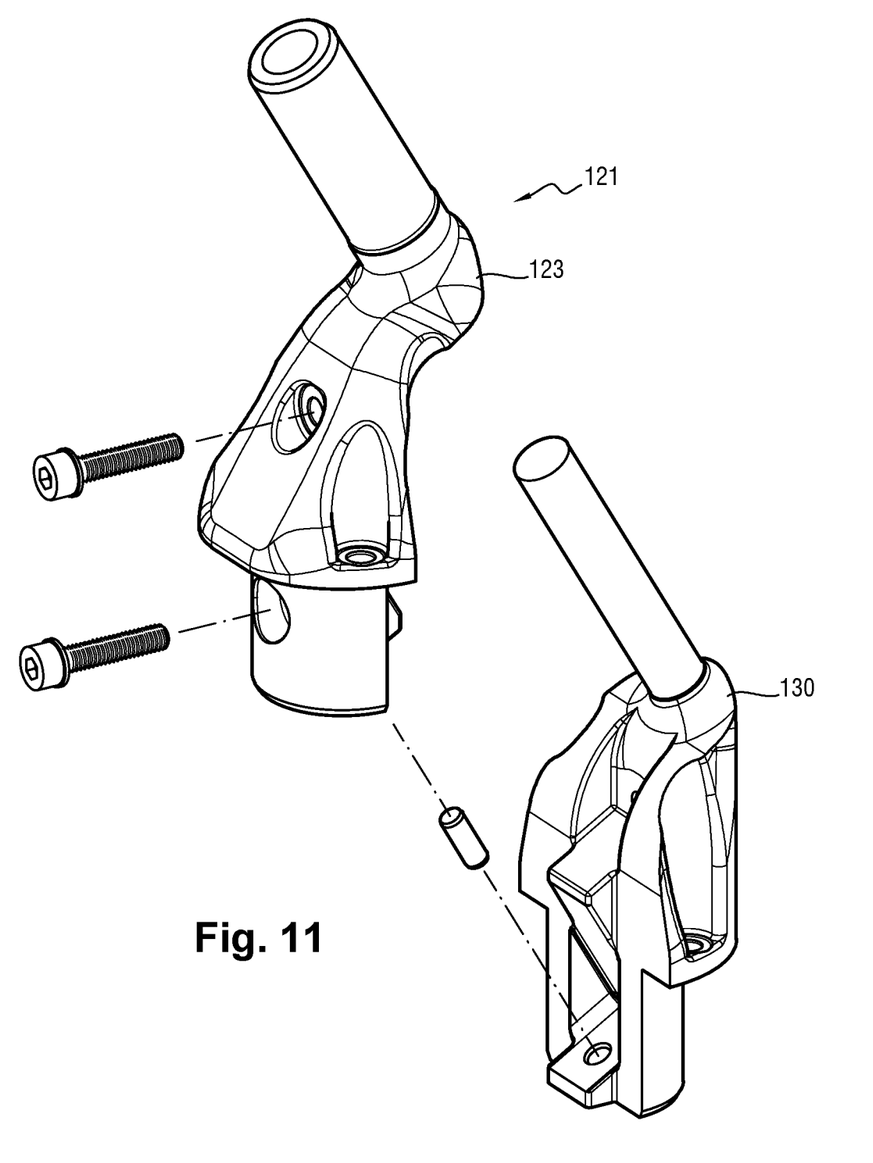
FIG. 11 is an exploded diagrammatic perspective view of a roll pin of the device of the invention.

The roll spider 80 is identical to the pitch spider 100 and the roll pin 121 is identical to the pitch pin 141.

Thus, the third rotary connection device 81 that connects the frame 20 to the roll spider 80 comprises a fourth bearing 27 that is carried by the first and second half-frames 20.1 and 20.2. The third rotary connection device 81 also comprises two male element parts, namely eleventh and twelfth male element parts 83 and 84, which parts are respectively identical to the fifth and sixth male element parts 103 and 104, and together they constitute a fifth pin 82. Finally, the third rotary connection device 81 comprises two other male element parts, namely thirteenth and fourteenth male element parts 93 and 94, which parts are respectively identical to the seventh and eighth male element parts 113 and 114, and together they constitute a sixth pin 92.

The fifth rotary connection device 122 connecting together the roll spider 80 and the roll pin 121 comprises a tenth bearing 97 that is carried by the third core 87 of the roll spider 80, with the roll pin 121 being engaged therein. The fifth rotary connection device 122 also comprises two male element parts, namely fifteenth and sixteenth male element parts 123 and 130, which parts are respectively identical to the ninth and tenth male element parts 143 and 144.

Stand Frame Connection

Figure 12:
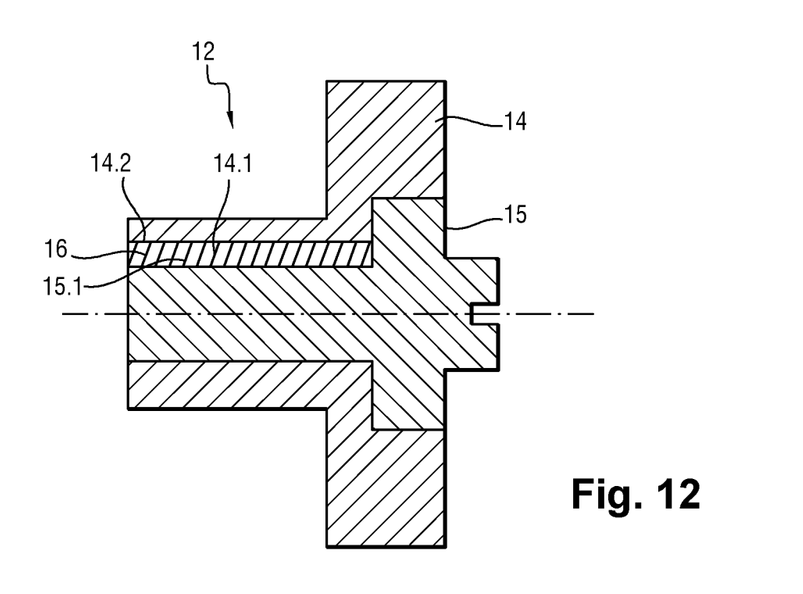
FIG. 12 is a diagrammatic section view of a frame hinge pin hinging it to the stand.

With reference to FIGS. 1, 2, and 12, a male element (specifically a seventh pin 12) cooperates with the second bearing 24. In corresponding manner, another male element (specifically an eighth pin 13) cooperates with the first bearing 23.

Figure 13:
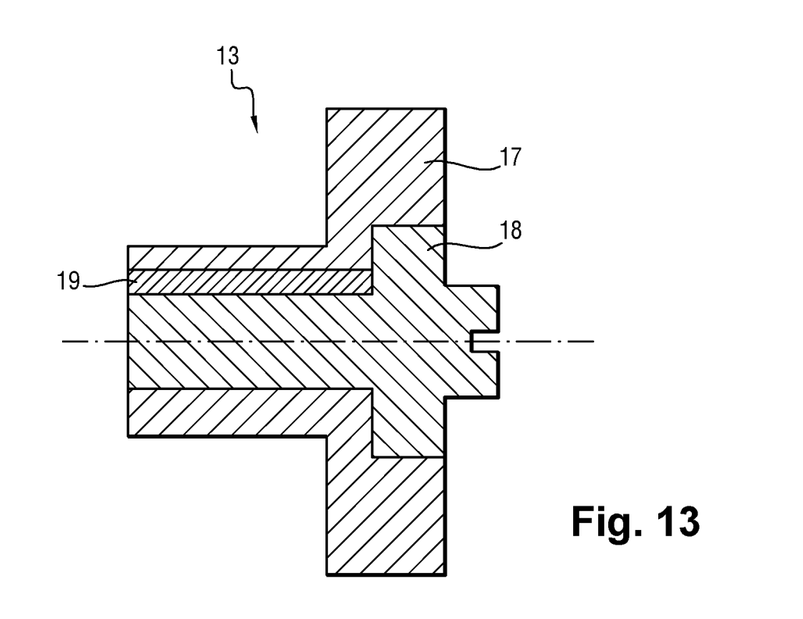
FIG. 13 is a diagrammatic section view of another frame hinge pin hinging it to the stand.

The seventh of the shaft 12 comprises a seventeenth rotary male element part 14 that includes a third opening 14.1 extending axially along the first axis $O_1$. A third axial groove 14.2 opens out into the third opening 14.1. An eighteenth male element part 15 extends in the third opening 14.1 and includes a fourth axial groove 15.1 for receiving a first key 16. In corresponding manner, the eighteenth pin 13 comprises a nineteenth male element part 17 that receives a twentieth male element part 18 connected by means of a second key 19.

The seventh and eighth pins 12 and 13 define respective male elements of the first rotary connection device 11. The reception housings of the first and second bearings 23 and 24 of the frame 20 define respective female elements of the first rotary connection device 11.

All of the parts described above can advantageously be made by additive manufacturing.

Naturally, the invention is not limited to the embodiment described, but covers any variant coming within the ambit of the invention as defined by the claims.

In particular:

although above, the first and second sectors are equal and together they occupy three hundred sixty degrees, the invention applies equally to sectors of other values that may be less than or greater than one hundred eighty degrees and that need not be equal;

although above, the lugs of the bearings are fastened by means of screws, the invention applies equally to other first and second means for fastening the lugs to the frame, e.g. such as adhesive, welding, bolting, or riveting;

although above, the internal housing is of cube shape, the invention applies equally to other types of housing, e.g. such as a housing that is of a rectangular, pyramid, or arbitrary shape; and although above, the invention includes ball bearings or roller bearings, the invention applies equally to other types of bearing for guiding rotary movement, e.g. such as smooth bearings, bronze bearings that may optionally be self-lubricating, rings, synthetic bushings, or needle bearings.

The invention claimed is:

1. A rotary connection device comprising a female element and a male element mounted in the female element to be rotatable about a first axis via a guide bearing for providing rotary guidance, the device being characterized in that each element comprises two parts, both of which are arranged to carry the bearing in such a manner as to hold the bearing in position independently of either one of the parts of the same element breaking.

2. The device according to claim 1, wherein the female element comprises both a first female element part and a second female element part, and the bearing includes first fastener means for fastening to the first female element part and second fastener means for fastening to the second female element part.

3. The device according to claim 2, wherein the first and/or second fastener means comprise a lug projecting from an outer surface of the bearing.

4. The device according to claim 3, wherein the lug includes at least one hole.

5. The device according to claim 2, wherein the female element includes a first housing for receiving the guide bearing and defined jointly by the first female element part and by the second female element part, the first female element part defining a first sector of the first housing centered about the first axis and the second female element part defining a second sector of the first housing centered about the first axis.

6. The device according to claim 5, wherein the first sector has a first amplitude substantially equal to one hundred eighty degrees, and the second sector has a second amplitude substantially equal to one hundred eighty degrees.

7. The device according to claim 1, wherein the female element includes a first housing for receiving the guide bearing and defined jointly by a first female element part defining a first portion of the first housing and by a second female element part defining a second portion of the first housing, the first and second portions of the first housing extending on opposite sides of a first plane orthogonal to the first axis.

8. The device according to claim 7, wherein the second female element part comprises first and second half-shells that are assembled to each other.

9. The device according to claim 1, wherein the female element comprises a first female element part defining a first housing for receiving the bearing and a second female element part defining a second housing for receiving the first female element part.

10. The device according to claim 9, wherein the second female element part comprises first and second half-shells that are assembled to each other about the first female element part.

11. The device according to claim 1, wherein the male element comprises first and second male element parts provided with third means for rotatably connecting them to turn about the first axis.

12. The device according to claim 11, wherein the first male element part includes a first opening through which the second male element part extends, at least partially.

13. The device according to claim 12 wherein the first male element part and the second male element part are both in contact with the bearing.

14. The device according to claim 12, wherein the first opening extends along a direction substantially parallel to the first axis.

15. The device according to claim 14, wherein the first male element part also includes a second opening that extends along a direction substantially orthogonal to the first axis and through which the second male element part extends, at least partially.

16. The device according to claim 1, wherein the male element includes a second connection device for rotary connection to turn about a second axis.

17. The device according to claim 16, wherein the second device for rotary connection to turn about a second axis.

18. An aircraft flight control device comprising:
a stand;
a frame rotatably mounted relative to the stand to turn about a first axis by means of a first rotary connection device according to claim 1, wherein the male element comprises first and second male element parts provided with third means for rotatably connecting them to turn about the first axis and wherein the first male element part includes a first opening through which the second male element part extends, at least partially;
a control arm for connecting to a manual handling interface and rotatably mounted on the frame by means of a second connection device according to claim 1, wherein the male element includes a second connection device for rotary connection to turn about a second axis and wherein the second device for rotary connection to turn about a second axis;
a roll spider rotatably mounted on the frame by means of a third rotary connection device according to claim 1, wherein the male element includes a second connection device for rotary connection to turn about a second axis and wherein the second device for rotary connection to turn about a second axis;
a pitch spider rotatably mounted on the control arm by means of a fourth connection device according to claim 1, wherein the male element includes a second connection device for rotary connection to turn about a second axis and wherein the second device for rotary connection to turn about a second axis;
a roll motor that is stationary relative to the frame and that includes a roll pin rotatably mounted on the roll spider by means of a fifth connection device according to claim 1, wherein the female element comprises a first female element part defining a first housing for receiving the bearing and a second female element part defining a second housing for receiving the first female element part; and
a pitch motor that is stationary relative to the frame and that includes a pitch pin rotatably mounted on the pitch spider by means of a sixth connection device according to claim 1, wherein the female element comprises a first female element part defining a first housing for receiving the bearing and a second female element part defining a second housing for receiving the first female element part.

* * * * *